(12) United States Patent
Przeszlo et al.

(10) Patent No.: US 10,006,756 B2
(45) Date of Patent: Jun. 26, 2018

(54) FLEXIBLE REFERENCE SYSTEM

(71) Applicant: United Technologies Corporation, Hartford, CT (US)

(72) Inventors: Zbigniew Przeszlo, Rocky Hill, CT (US); Randall Joyner, Union, CT (US)

(73) Assignee: United Technologies Corporation, Farmington, CT (US)

( * ) Notice: Subject to any disclaimer, the term of this patent is extended or adjusted under 35 U.S.C. 154(b) by 78 days.

(21) Appl. No.: 14/781,530

(22) PCT Filed: Apr. 2, 2014

(86) PCT No.: PCT/US2014/032685
§ 371 (c)(1),
(2) Date: Sep. 30, 2015

(87) PCT Pub. No.: WO2014/165595
PCT Pub. Date: Oct. 9, 2014

(65) Prior Publication Data
US 2016/0061580 A1 Mar. 3, 2016

Related U.S. Application Data

(60) Provisional application No. 61/807,563, filed on Apr. 2, 2013.

(51) Int. Cl.
*G01B 11/00* (2006.01)
*F01D 25/00* (2006.01)
*G01B 11/25* (2006.01)
*F01D 5/14* (2006.01)
*F01D 21/00* (2006.01)

(52) U.S. Cl.
CPC ............ *G01B 11/002* (2013.01); *F01D 25/00* (2013.01); *G01B 11/2545* (2013.01); *F01D 5/141* (2013.01); *F01D 21/003* (2013.01)

(58) Field of Classification Search
CPC .... G01B 11/24; G01B 11/2545; G01B 11/002
See application file for complete search history.

(56) References Cited

U.S. PATENT DOCUMENTS

| | | | |
|---|---|---|---|
| 4,830,443 A | 5/1989 | Hecker | |
| 5,018,803 A | 5/1991 | Hecker et al. | |
| 5,400,428 A | 3/1995 | Grace | |
| 5,438,449 A | 8/1995 | Chabot | |
| 5,465,142 A | 11/1995 | Krumes | |
| 5,504,595 A | 4/1996 | Marom | |
| 5,506,703 A | 4/1996 | Suzuki | |
| 5,555,130 A | 9/1996 | Marom | |
| 5,900,954 A | 5/1999 | Katz | |
| 6,319,006 B1 | 11/2001 | Scherer | |
| 6,459,481 B1 * | 10/2002 | Schaack | A61B 5/1076 356/241.1 |
| 6,478,232 B1 | 11/2002 | Dowling | |
| 7,270,277 B1 | 9/2007 | Koziol | |
| 7,532,332 B2 | 5/2009 | Gomercic | |

(Continued)

*Primary Examiner* — Hina F Ayub
*Assistant Examiner* — Amanda Merlino
(74) *Attorney, Agent, or Firm* — O'Shea Getz P.C.

(57) ABSTRACT

A method of optical data acquisition includes shaping a flexible reference system to be at least partially within a limited line of sight volume with respect to a workpiece.

18 Claims, 4 Drawing Sheets

(56) References Cited

U.S. PATENT DOCUMENTS

| | | | |
|---|---|---|---|
| 7,573,586 B1 * | 8/2009 | Boyer | B05B 12/084 |
| | | | 356/390 |
| 7,578,178 B2 | 8/2009 | Boyer | |
| 7,868,926 B2 | 1/2011 | Rainier | |
| 8,274,663 B2 | 9/2012 | Pan | |
| 2009/0242638 A1 | 10/2009 | Silverbrook et al. | |
| 2011/0248941 A1 | 10/2011 | Abdo et al. | |
| 2012/0004921 A1 | 1/2012 | Silverbrook et al. | |
| 2015/0116728 A1 * | 4/2015 | Lacome | G01B 11/002 |
| | | | 356/601 |

\* cited by examiner

US 10,006,756 B2

FLEXIBLE REFERENCE SYSTEM

This application claims priority to PCT Patent Application No. PCT/US2014/032685 filed Apr. 2, 2014, which claims priority to U.S. Patent Appln. No. 61/807,563 filed Apr. 2, 2013.

BACKGROUND

The present disclosure relates to an optical measurement system and, more particularly, to a flexible reference system therefor.

Three-dimensional optical data acquisition systems optically acquire a multitude of X, Y, Z coordinates with small reference encoded dots randomly placed on or around a workpiece to form a reference system to match image acquisition from multiple angles. The system needs to image a minimum of three reference dots in any given measurement to collect and triangulate a point cloud for any feature.

Conventional application of such data acquisition systems collect random reference point data but leave gaps where a reference could not be formed. Alternatively, custom reference frames specific to a single workpiece configuration locate the reference encoded dots within a field of view but may be relatively expensive and difficult to manufacture.

SUMMARY

A method of optical data acquisition according to one disclosed non-limiting embodiment of the present disclosure includes shaping a flexible reference system to be at least partially within a limited line of sight volume with respect to a workpiece.

In a further embodiment of the present disclosure, the limited line of sight volume is defined by a first and second image capture device.

In a further embodiment of any of the foregoing embodiments of the present disclosure, the flexible reference system locates a multiple of encoded dots adjacent to the workpiece.

A further embodiment of any of the foregoing embodiments of the present disclosure includes shaping the flexible reference system to follow a feature of the workpiece.

A method of optical data acquisition of a gas turbine engine blade according to another disclosed non-limiting embodiment of the present disclosure includes shaping a flexible reference system to be at least partially within a limited line of sight volume with respect to an edge of the gas turbine engine blade.

A further embodiment of any of the foregoing embodiments of the present disclosure includes shaping the flexible reference system around the edge.

In a further embodiment of any of the foregoing embodiments of the present disclosure, the limited line of sight volume is defined by a first and second image capture device.

In a further embodiment of any of the foregoing embodiments of the present disclosure, the flexible reference system locates a multiple of encoded dots adjacent to the workpiece.

An optical data acquisition system according to another disclosed non-limiting embodiment of the present disclosure includes a flexible reference system.

A further embodiment of any of the foregoing embodiments of the present disclosure includes a multiple of encoded dots on a flexible frame of the flexible reference system.

In a further embodiment of any of the foregoing embodiments of the present disclosure, the flexible reference system locates the multiple of encoded dots adjacent to a workpiece.

A further embodiment of any of the foregoing embodiments of the present disclosure includes a turntable that supports said flexible frame.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
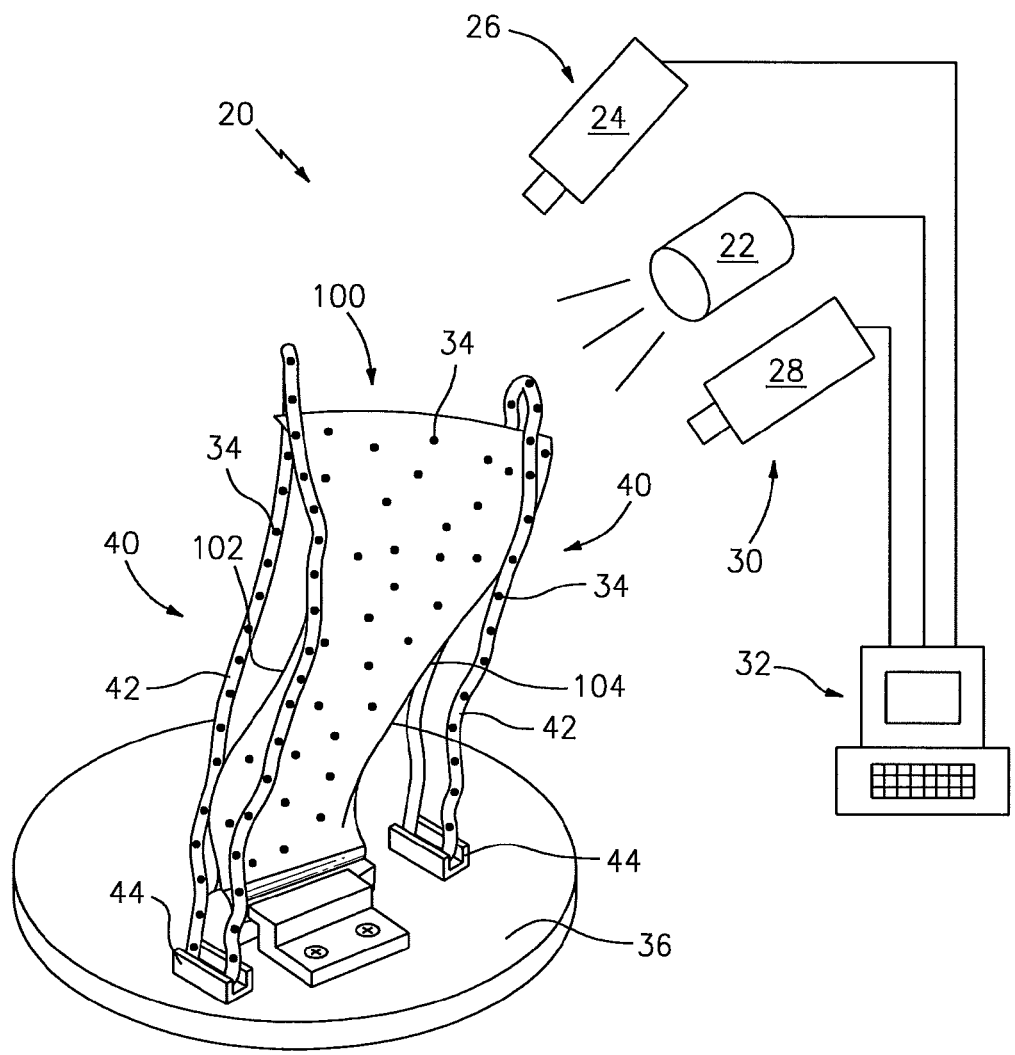
FIG. 1 is a schematic view of an optical data acquisition system.

FIG. 1 schematically illustrates an optical data acquisition system 20 such as ATOM SO-4M provided by GOM mbH of Braunschweig, Germany. The optical data acquisition system 20 generally includes a light projector 22, a first image capture device 24, such as a digital camera, at a first location 26, a second image capture device 28 at second location 30 and a control subsystem 32.

Figure 2:
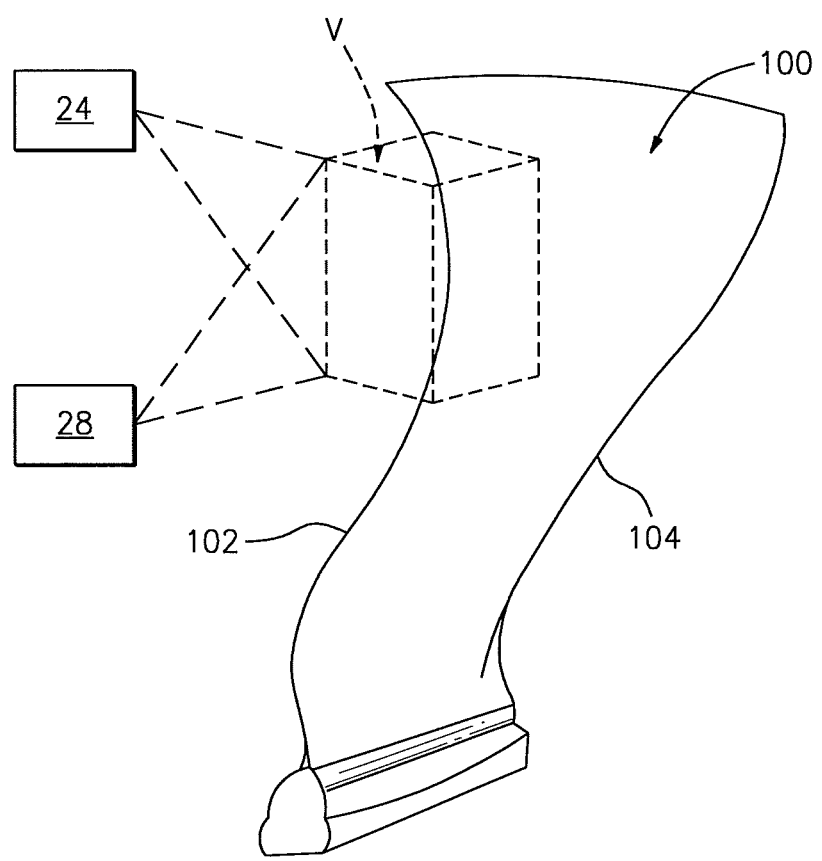
FIG. 2 is a schematic view of a limited sight volume with respect to a workpiece.

The optical data acquisition system 20 projects a light pattern onto a workpiece 100 such as, in the illustrated non-limiting embodiment, a fan blade. The two image capture devices 24, 28 provide a limited line of sight volume V (FIG. 2) to acquire a multitude of encoded dots 34 randomly placed on or around the workpiece 100 to form a reference system to match measurements from multiple angles as the workpiece 100 is rotated on a turntable 36.

The optical data acquisition system 20 must image a minimum of three reference dots 34 within the limited line of sight volume V provided by the two image capturing devices 24, 28 in any given measurement to determine a point cloud of X, Y, Z coordinates to provide three-dimensional data acquisition. The control subsystem 32 merges all the images of the encoded dots 34 to triangulate and generate a 3-dimensional relationship and location of all the encoded dots 34.

The limited line of sight volume V defined by the image capture device 24, 28 may typically be about 12×12×12 inches (300 cubic mm). Through triangulation, a surface map of the workpiece 100 is readily constructed by the control subsystem 32.

The workpiece 100 such as a fan blade has a very thin and sharp leading edge 102 and trailing edge 104 which may be at an angle where a portion of the respective edge 102, 104 is within the limited line of sight volume V, but the minimum of three encoded dots 34 are not. Also, the encoded dots 34 cannot be located on the edges 102, 104 without obscuring the edges 102, 104.

Figure 3:
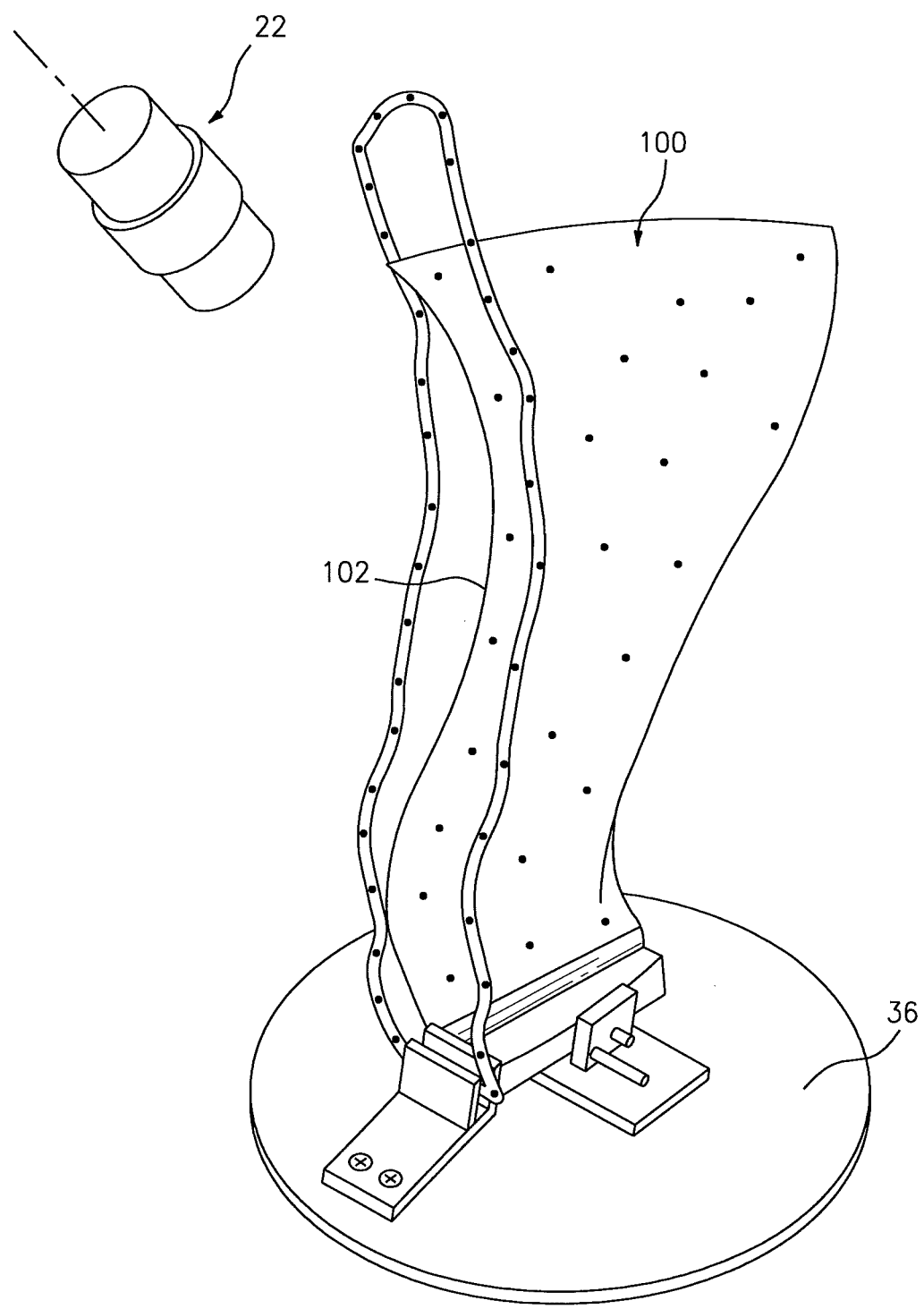
FIG. 3 is a first perspective view of a flexible reference system.
Figure 4:
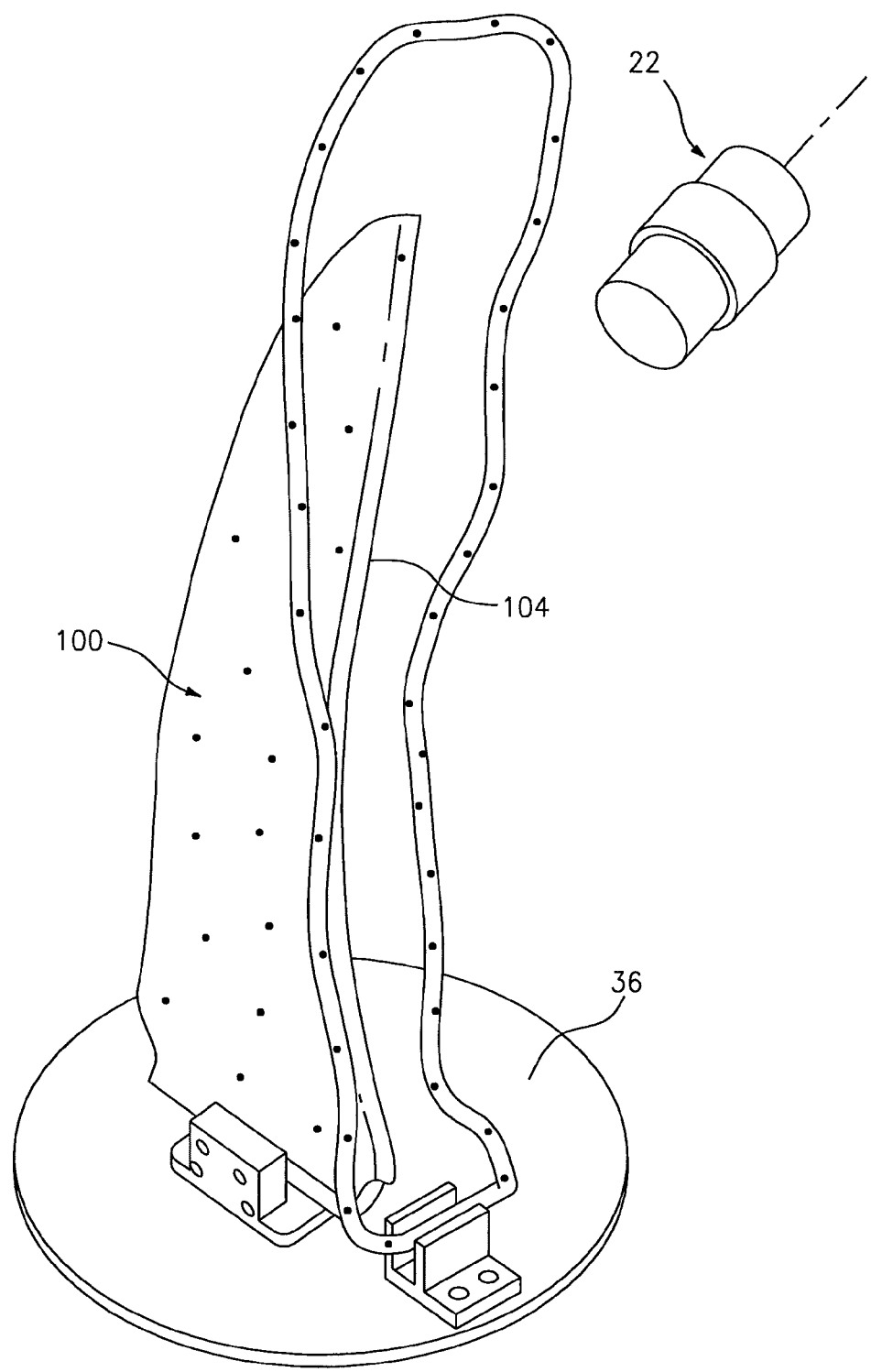
FIG. 4 is a second perspective view of the flexible reference system.

To assure the optical data acquisition system 20 images a minimum of three encoded dots 34 in the limited line of sight volume V a flexible reference system 40 is located adjacent each edge 102, 104. The flexible reference system 40 generally includes a flexible frame 42 upon which a multiple of encoded dots 34 are located. The flexible frame 42 may be attached to the turntable 36 with a mount 44 such that the respective flexible frame 42 may, for example, be shaped to follow the contour of each edge 102, 104 to thereby locate at least three encoded dots 34 in the limited line of sight volume V (FIG. 3). It should be appreciated that various flexible and articulable structures may be utilized as the flexible frame 92.

In conjunction with the encoded dots 34 located on the workpiece 100, the flexible reference system 40 provides additional encoded dots 34 to orient the optical data acquisition system 20 at areas where there are otherwise not sufficient surface areas for the encoded dots 34 (e.g., edges 102, 104). The flexible reference system 40 orients the optical data acquisition system 20 in such a manner as to permit the image of the edges 102, 104 because the encoded dots 34 are not physically located on the workpiece 100 but are still within the limited line of sight volume V. That is, the flexible frame 42 is shaped to follow, for example, the edges 102, 104 of the workpiece 100 to locate the encoded dots 34 within the limited line of sight volume V of the image capture devices 24, 28.

It should be appreciated that although a fan blade is illustrated in a disclosed non-limiting embodiment, other application will benefit herefrom such as an inside surface of a fan blade sheath that has a narrow deep internal surface that slides on a blade body. The narrow passage has no surface area that can receive encoded dots 34, so the sheath is supported at each end and the flexible reference system 40 allows the measurement of the internal surface.

Still another application is the measurement of birds for use in bird ingestion finite element analysis. That is, the bird operates as a projectile that must be precisely measured for accurate analysis when fired into, for example, a gas turbine engine, aircraft canopy, etc.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of optical data acquisition comprising:
    shaping a flexible reference system to be at least partially within a limited line of sight volume with respect to a workpiece;
    wherein a void extends between and separates a portion of the flexible reference system and the workpiece.

2. The method as recited in claim 1, wherein the limited line of sight volume is defined by a first camera and a second camera.

3. The method as recited in claim 1, wherein the flexible reference system locates a multiple of encoded dots adjacent to the workpiece.

4. The method as recited in claim 1, further comprising shaping the flexible reference system to follow a feature of the workpiece.

5. The method as recited in claim 1, wherein the flexible reference system follows a contour that is different than a contour of the workpiece.

6. The method as recited in claim 1, wherein the flexible reference system is attached to a support by a first mount, and the workpiece is supported by the support.

7. The method as recited in claim 6, wherein the workpiece is attached to the support by a second mount.

8. The method of claim 1, wherein the flexible reference system is not attached to the workpiece.

9. A method of optical data acquisition of a gas turbine engine blade comprising:
    shaping a flexible reference system to be at least partially within a limited line of sight volume with respect to an edge of the gas turbine engine blade;
    wherein the flexible reference system follows a contour that is different than a contour of the edge of the gas turbine engine component; and
    wherein an air gap extends between and separates a portion of the flexible reference system and the gas turbine engine blade.

10. The method as recited in claim 9, further comprising shaping the flexible reference system around the edge.

11. The method as recited in claim 9, wherein the limited line of sight volume is defined by a first camera and a second camera.

12. The method as recited in claim 11, wherein the flexible reference system locates a multiple of encoded dots adjacent to the workpiece.

13. The method of claim 9, wherein the flexible reference system is not attached to the gas turbine engine blade.

14. An optical data acquisition system comprising:
    a support;
    a mount configured with the support, the mount comprising a bracket; and
    a flexible reference system comprising a flexible frame and a multiple of encoded dots on the flexible frame, the flexible frame attached to the support by the bracket.

15. The system as recited in claim 14, wherein said flexible reference system locates said multiple of encoded dots adjacent to a workpiece.

16. The system as recited in claim 14, wherein the support comprises a turntable with a flat planar surface, and the bracket attaches the flexible frame to the flat planar surface.

17. The system as recited in claim 14, further comprising:
    a second mount configured with the support; and a second flexible reference system comprising a second flexible frame and a multiple of second encoded dots on the second flexible frame, the second flexible frame attached to the support by the second mount.

18. The system as recited in claim 14, further comprising a second mount configured with the support discrete from the mount, wherein the second mount is adapted to attach a workpiece to the support such that the flexible reference system is at least partially within a limited line of sight volume with respect to the workpiece being secured by the second mount.

* * * * *